United States Patent [19]

Osendorf

[11] Patent Number: 4,863,499
[45] Date of Patent: Sep. 5, 1989

[54] ANTI-DUFFUSION CHEMICAL BREATHER ASSEMBLY FOR DISK DRIVES

[75] Inventor: Richard J. Osendorf, West St. Paul, Minn.

[73] Assignee: Donaldson Company, Inc., Minneapolis, Minn.

[21] Appl. No.: 226,038

[22] Filed: Jul. 29, 1988

[51] Int. Cl.$^4$ .................... B01D 46/12; B01D 53/04
[52] U.S. Cl. .................................... 55/316; 55/320; 55/385.6; 55/387; 55/486; 55/502; 55/503; 360/97.02
[58] Field of Search ................ 55/316, 320, 385.1, 55/385.6, 387, 486–489, 502, 503, 510; 360/97.02, 97.03, 97.04, 130.1, 131

[56] References Cited

U.S. PATENT DOCUMENTS

| | | | |
|---|---|---|---|
| 3,861,894 | 1/1975 | Marsh | 55/316 |
| 4,054,931 | 10/1977 | Bolton et al. | 360/97.03 |
| 4,280,155 | 7/1981 | Scott et al. | 360/97.03 |
| 4,295,734 | 10/1981 | Tsuda et al. | 55/385.6 X |
| 4,329,722 | 5/1982 | West | 360/97.03 |
| 4,369,475 | 1/1983 | Ho et al. | 360/97.02 |
| 4,410,341 | 10/1983 | Edwards et al. | 55/385.6 X |
| 4,538,192 | 8/1985 | White et al. | 360/97.03 X |
| 4,548,626 | 10/1985 | Ackley et al. | 55/316 |
| 4,594,082 | 6/1986 | Catherwood, Sr. | 55/316 |
| 4,642,715 | 2/1987 | Ende | 360/97.02 |
| 4,657,570 | 4/1987 | Gronholz et al. | 55/385.6 |
| 4,663,349 | 12/1986 | Beck et al. | 55/484 X |
| 4,678,489 | 7/1987 | Bertelsen | 55/316 X |
| 4,684,510 | 8/1987 | Harkins | 55/385.6 X |
| 4,737,173 | 4/1988 | Kudirka et al. | 55/316 X |
| 4,749,385 | 6/1988 | Brunner et al. | 55/320 X |
| 4,751,594 | 6/1988 | Blanks | 360/97.02 |
| 4,777,549 | 10/1988 | Dushkes et al. | 360/97.03 |

OTHER PUBLICATIONS

Microcontamination, pp. 41 et seq. (Apr. 1987).

*Primary Examiner*—Robert Spitzer
*Attorney, Agent, or Firm*—Merchant, Gould, Smith, Edell, Welter & Schmidt

[57] ABSTRACT

An anti-diffusion chemical breather assembly for disk drives having a body portion (20), a cover portion (40), and a filter media (50), including a layer (51) impregnated with activated charcoal granules (53). When assembled, the body portion (20) and cover portion (40) define therebetween a sealed tortuous passage 15 which provides fluid communication between external environment and a hard disk drive interior when the apparatus is positioned in a receiving cavity of a hard disk drive. The tortuous passage limits the rate of moisture entry into the disk drive unit.

16 Claims, 5 Drawing Sheets

ANTI-DUFFUSION CHEMICAL BREATHER ASSEMBLY FOR DISK DRIVES

TECHNICAL FIELD

The present invention relates to an anti-diffusion apparatus for a computer disk drive unit. An anti-diffusion breather filter assembly limits the rate of moisture entry into the disk drive unit.

BACKGROUND OF THE INVENTION

The present invention is intended for use with hard or "Winchester" disk drives. Hard disk drives are sealed enclosures in which an inflexible platter coated with magnetic material is spun very rapidly. A magnetic read/write head "flies" only a few microns above the disk on an air cushion. One area of increasing importance in hard disk drives is the need to increase efficiency. This is in part accomplished by positioning the heads in closer proximity to the disk in order to increase the speed of response time. In this regard, positioning the heads as close to the disk without touching it, is essential. However, if particulate matter becomes lodged between the disk and the head, the disk drive can be destroyed.

A major concern in maintaining a hard disk drive unit in operating condition is moisture control. This is a concern since water vapor can generate corrosion within the disk drive unit. Also, moisture acts as particulate matter when present in the drive and can impair operation of the disk drive unit.

Typically, the platter or disk spins at a speed of about 3,000 to 36,000 rpms. This results in an internal operating temperature of about 150° F. At this temperature, moisture drawn into the disk drive unit through the breather air filter is burned off. However, when the disk drive unit is not in operation moisture entering the disk drive unit is a concern. In environmentally controlled surroundings the entry of moisture into the disk drive can be minimized. However, many hard disk drives are utilized with smaller personal computers in offices and residential environments where concern with moisture when the drive is shut down can present a much greater problem. To address this problem, many disk drive manufacturers place a desiccant package in their disk drives to absorb moisture. This desiccant package is usually sized to provide moisture absorption throughout the life of the drive. During operation at the typical operation temperature of approximately 150° moisture in the drive is either dissipated or absorbed by the desiccant package. When the drive is not in operation moisture enters the drive by way of diffusion through the hole in the breather or disk drive cover. If the drive is shut down, quite often, it may be possible that the desiccant pack will become saturated.

Accordingly, there is a need for an apparatus which during shut down periods of the disk drive inhibits or extends the rate of time for moisture entering the drive to reach the internal components thereof, thereby facilitating efficient operation of the disk drive unit and eliminating or reducing the amount of desiccant material used.

SUMMARY OF THE INVENTION

The present invention relates to an anti-diffusion apparatus for a hard disk drive with a breather filter element. In a preferred embodiment, the apparatus comprises a body portion, a cover portion and a filter media. The body portion includes at least one tortuous passage therein extending from an inlet at an outer end of the upper surface of the body portion to an outlet at the inner end of a lower surface of the body portion. Most preferably, the passage is configured as an inwardly spiralling channel. In a preferred embodiment, a cover portion having a first surface and a second surface and at least one opening therethrough is secured to the body portion with the first surface cooperatively engaging the lower surface of the body portion. When secured to the body portion, the opening through the cover portion is aligned with the outlet of the passage in the body portion, thereby forming a sealed passage between the body portion and the cover portion. This sealed passage provides fluid communication between the external environment and the hard disk drive interior when the apparatus is positioned in a receiving cavity of a hard disk drive unit. Further, a preferred embodiment, includes a high efficiency particulate air media (HEPA) secured to the second surface of the cover. Most preferably, the inner layer of the HEPA media includes an activated charcoal layer to facilitate removal of harmful gases before they enter the drive. Preferably, the body and cover portions are made of moldable plastic material and form an integral one-piece breather assembly.

While the preferred embodiment of the present invention includes a tortuous passage in the form of an inwardly spiralling channel along the lower surface of the body portion or plate member, a number of other maze-like configurations can be used.

The present invention advantageously slows down the rate of moisture entry into the disk drive unit by directing moisture through an extended passage before reaching the inside of the disk drive unit. This reduces the potential for moisture damage to the hard disk drive and prolongs the useful life of the desiccant in the drive unit, thereby extending the operating life of the disk drive unit and facilitating greater efficiency.

These and other advantages and features of novelty which characterize the invention are pointed out with particularity in the claims annexed hereto and forming a part hereof. However, for a better understanding of the invention, its advantages and objects attained by its use, reference should be had to the drawings which form a further part hereof and to the accompanying descriptive matter in which there is illustrated and described a preferred embodiment of the invention.

DETAILED DESCRIPTION OF A PREFERRED EMBODIMENT

Figure 1:
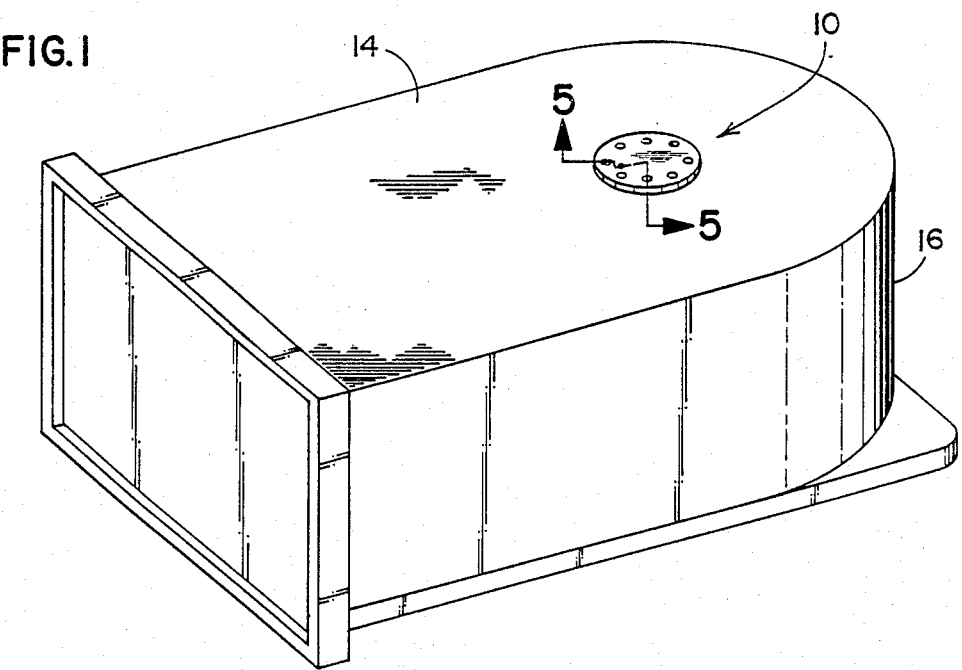
FIG. 1 is a perspective view of the present invention in place in a disk drive unit.

Referring now to the drawings, there is shown in FIGS. 1-5 a preferred embodiment of the present invention generally referred to by the reference numeral 10. As is illustrated, the preferred embodiment of the present invention has three components; a body portion 20, a cover portion 40, and a filter media 50. It will be appreciated that although the preferred embodiment includes generally circular-shaped components, the components of the assembly could have a wide variety of shapes, an oval, a rectangle, or square.

Figure 4:
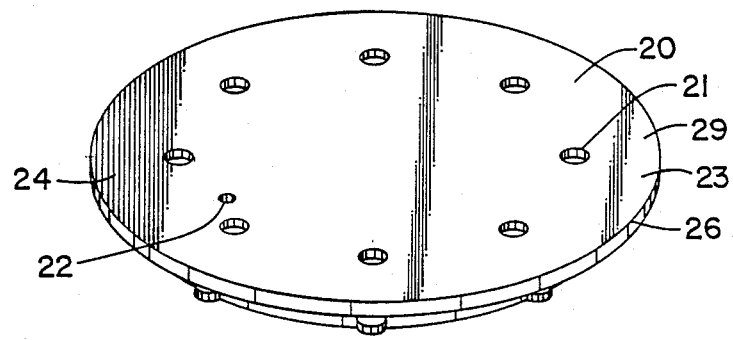
FIG. 4 is a top perspective view of a preferred embodiment of the present invention.
Figure 5:
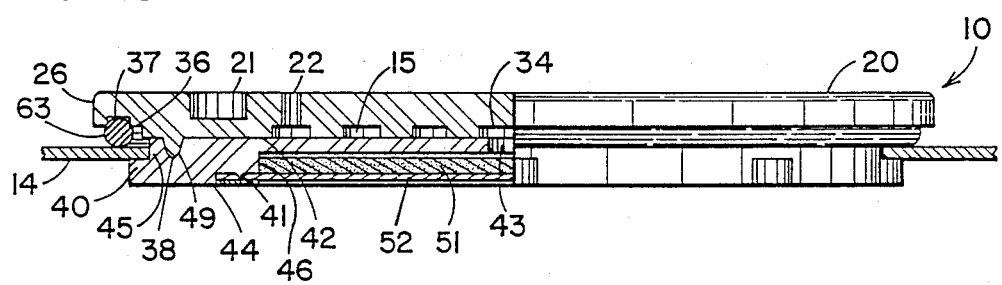
FIG. 5 is a sectional view taken along line 5—5 of FIG. 1.

In the preferred embodiment, the body portion 20 of the present invention 10 has a generally circular shape and includes an exterior surface 23 and lower surface 35. As best seen in FIGS. 4 and 5, exterior surface 23 has an upper surface 29 and an outer edge 26. A flange 37 proximate the periphery of body member 20 is provided to seat an O-ring 63 between the anti-diffusion apparatus 10 and outer surface 14 of the disk drive cover. Flange 37 extends from outer edge 26 of body portion 20 to inner ridge 36 proximate coaxial inner edge 38. When the anti-diffusion apparatus 10 is positioned in a receiving cavity of a hard disk drive, the O-ring 63 prevents peripheral leakage of external environment moisture and contaminants into the disk drive unit 16.

Figure 2:
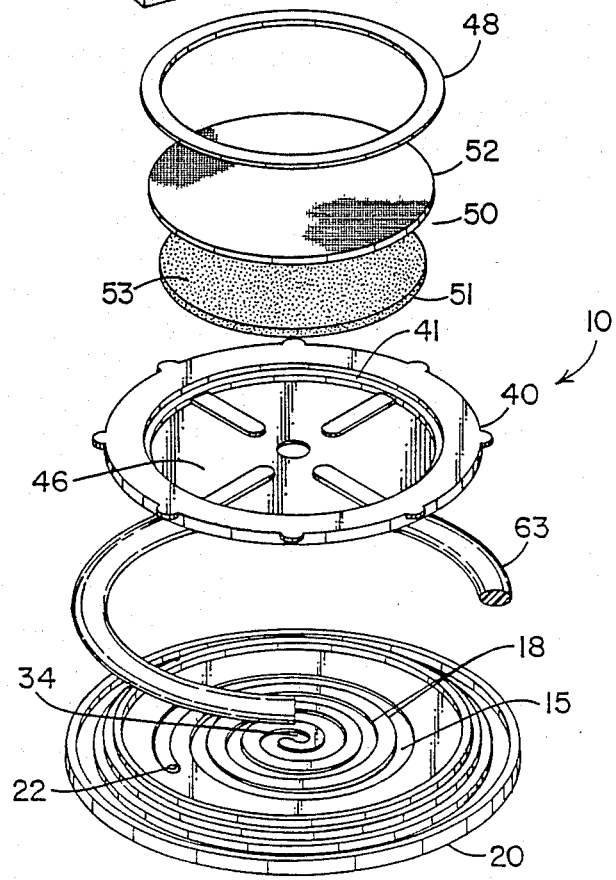
FIG. 2 is an exploded perspective view of the components of the preferred embodiment of the invention.
Figure 3:
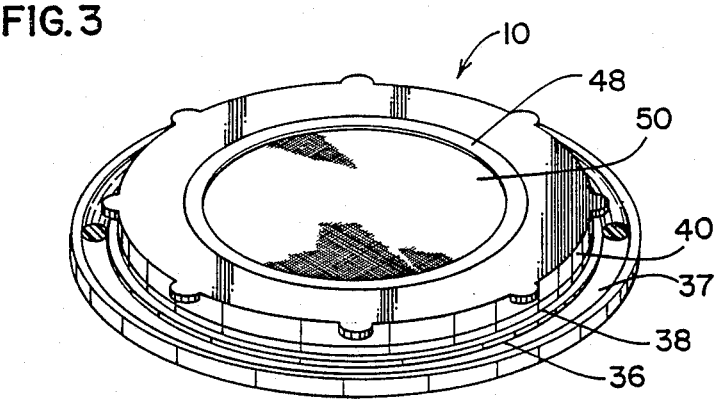
FIG. 3 is a bottom perspective view of a preferred embodiment of the present invention.
Figure 6:
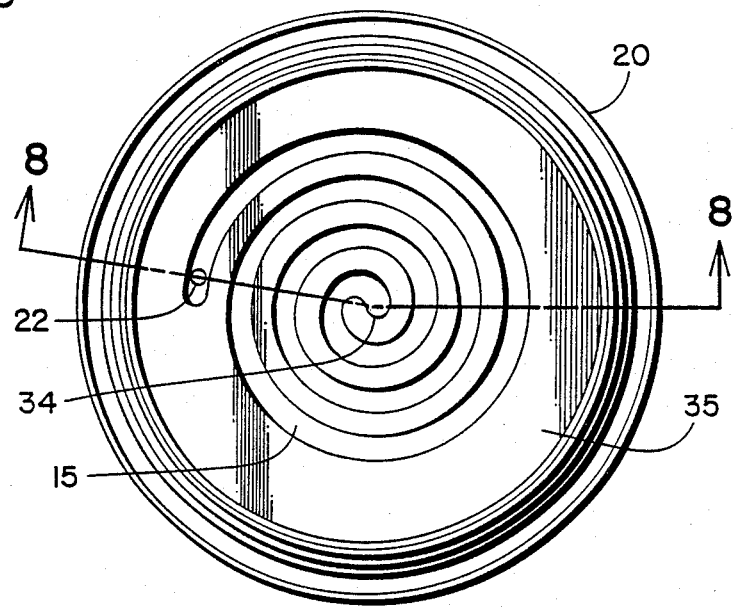
FIG. 6 is a bottom plan view of the body portion of a preferred embodiment of the present invention.
Figure 7:
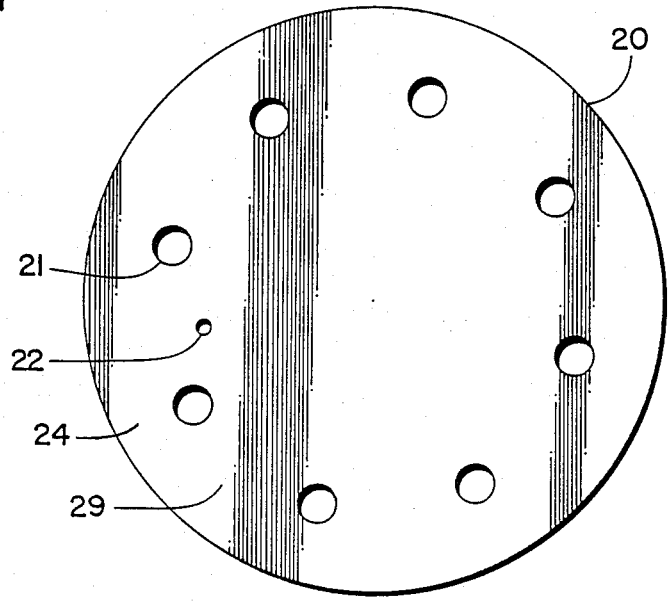
FIG. 7 is a top plan view of the body portion of a preferred embodiment of the present invention.
Figure 8:
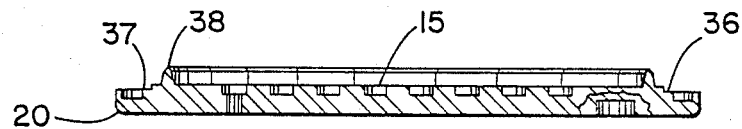
FIG. 8 is a sectional view taken along line 8—8 of FIG. 7.

Body portion 20 includes a tortuous passage 15 in lower surface 35. As seen in FIG. 2 tortuous passage 15 is an inwardly spiralling channel or groove having walls 18 substantially perpendicular to lower surface 35. Referring to FIGS. 4-6, passage 15 extends from inlet 22 to outlet 34. While it is to be understood that inlet 22 can be located anywhere along exterior surface 23; in the preferred embodiment inlet 22 is located at outer end 24 of upper surface 29. As seen in FIGS. 4-6, outlet 34 is positioned at the inner end of lower surface 35. In a preferred embodiment, inlet 22 has a diameter which is less than the width of passage 15. The restricted size of inlet 22 minimizes the amount of moisture entering passage 15. Blind holes 21 are provided along the upper surface 29 for inserting the anti-diffusion apparatus 10 into the disk drive cover 14. Specifically, blind holes 21 are dimensioned to accept pins on an insertion tool (not shown) having a recessed diameter slightly larger than the diameter of the apparatus 10. In the recessed area of the tool, the pins are on the same bolt circle pattern as the holes 21 in the body portion 20. These pins fit into holes 21 and allow the installer to press apparatus 10 against cover 14, compressing O-ring 63 and rotating the apparatus 10 to lock it in place.

Figure 9:
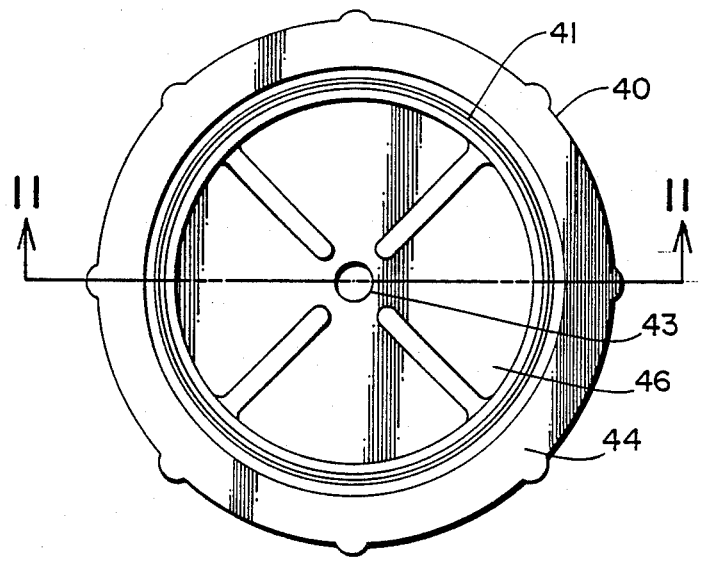
FIG. 9 is a bottom plan view of the cover portion of a preferred embodiment of the present invention.
Figure 10:
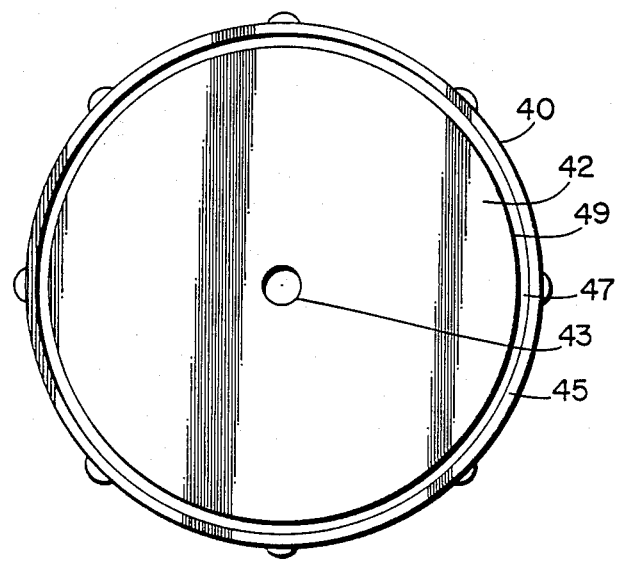
FIG. 10 is a top plan view of the cover portion of a preferred embodiment of the present invention.
Figure 11:
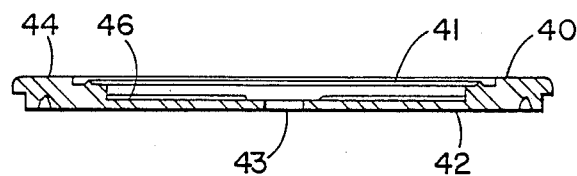
FIG. 11 is a sectional view taken along line 11—11 of FIG. 9.

Referring to FIGS. 9-11, the cover 40 includes a first surface 42 and a second surface 44 and a generally centrally located opening 43. Cover 40 is generally circular in shape and cooperatively engages body portion 20 as best seen in FIG. 5. More specifically, cover 40 cooperatively engages interior or lower surface 35 of body portion 20 opening with outlet 34 of body portion 20 aligned with opening 43 of cover 40. In a preferred embodiment, body 20 is interlockingly secured to cover 40 proximate the circumference of apparatus 10 by inner edge 38 fitting within slot 47 defined by inner border 49 and outer rim 45 of cover 40. As best seen in FIG. 5, when body portion 20 and cover portion 40 are in cooperative engagement with lower surface 35 of body portion 20 engaging first surface 42 of cover portion 40, passage 15 is sealed by said engaged body 20 and cover 40 portions.

Sealed passage 15 provides for fluid communication between the external environment and the hard disk drive interior when apparatus 10 is positioned in a receiving cavity of a hard disk drive as seen in FIG. 1. Passage 15 maximizes the distance for inertial separation of contaminants and moisture entering inlet 22, thereby eliminating or reducing the amount of desiccant material needed in the hard disk drive unit 16. Passage 15 also extends the useful life of a breather filter since moisture and harmful gases dissipated over the length of passage 15 will not reach the filter element 50. In a preferred embodiment, cover 40 is also provided with central recess 46 which houses filter assembly 50 on the second surface 44. Filter media 50 is sealed in central recess 46 of cover 40 by ultrasonically welding media 50 to surface 41 as best seen in FIG. 5. Referring to FIG. 2, an adhesive vinyl ring seal 48 is employed to secure raw edges of filter media 50 between ring 48 and cover 40.

In a preferred embodiment, filter media 50 is a high efficiency particulate media (HEPA) having inner layer 51 and outer layer 52. In order to facilitate removal of harmful gases in the external environment such as organic vapors and gases including hydrocarbons, polyvinyl chlorides, ammonia and sulfurs, inner layer 51 is impregnated with activated charcoal granules 53.

In a preferred embodiment, body portion 20, cover portion 40 and filter 50 form an integral one-piece unit. Body portion 20 and cover portion 40 are preferably injection molded from thermo-plastic and are ultrasonically welded together. Alternatively, body portion 20 and cover portion 40 can be constructed from materials that can be snap locking or adhesively bonded.

Figure 13:
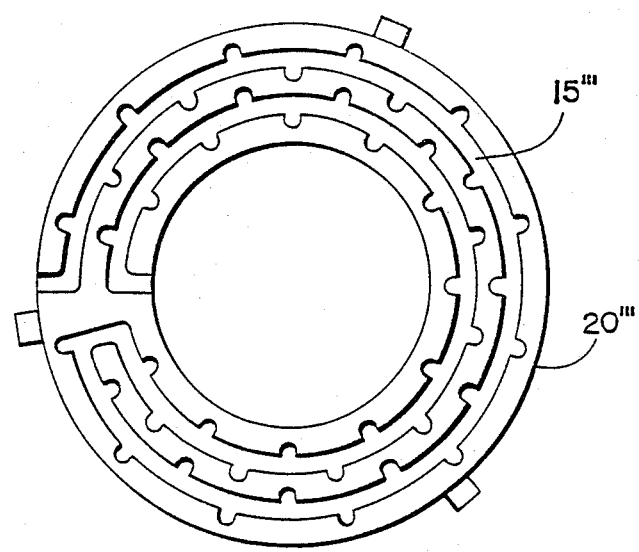
FIGS. 12-13 show alternate configurations of tortuous passages for an anti-diffusion apparatus according to the present invention.
Figure 12:
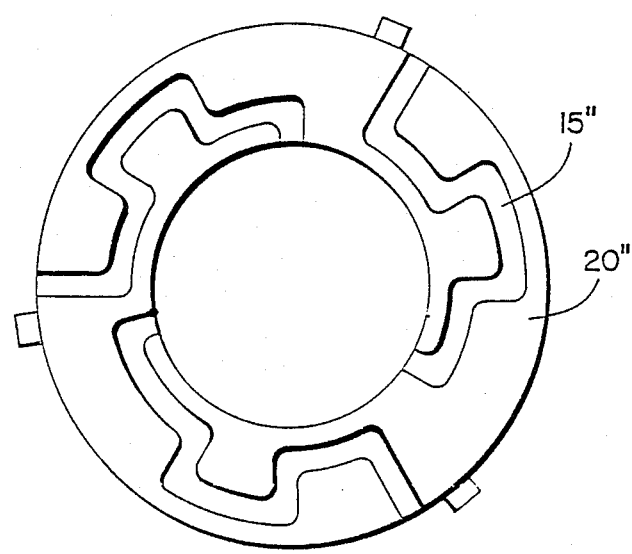

While the preferred embodiment of the invention 10 shown has an inwardly spiral shaped channel 15 it is to be understood that the tortuous path which serves to restrict and dissipate preclude entry of moisture and other contaminants into the interior environment of the hard disk drive by inertial separation can have a number of other maze-like configurations. FIGS. 12-13 illustrate alternative maze-like configurations 15", and 15''' in body portions 20" and 20''', respectively, which can be used in embodiments of the present invention.

It must be understood, however, that even though numerous advantages and characteristics of the invention have been set forth in the foregoing description, together with details of the structure and function of the invention, the disclosure is illustrative only, and changes may be made in detail, especially in matter of shape, size and materials of the components within the principal of the invention, to the full extent indicated by the broad general meaning of the terms in which the appended claims are expressed.

What is claimed is:

1. An anti-diffusion apparatus for a hard disk drive comprising:
   (a) a body portion having an exterior surface and a lower surface, said lower surface including at least one tortuous therein, said passage extending from an inlet at said exterior surface of said body portion to an outlet along said lower surface of said body portion;

(b) a cover portion having a first surface and a second surface and at least one opening therethrough, said first surface secured to said body portion with said first surface cooperatively engaging said lower surface of said body portion with said outlet of said body portion aligned with said opening through said cover portion, said engaged body and cover portions forming a sealed passage therebetween, said sealed passage providing fluid communication between external environment and hard disk drive interior when said apparatus is positioned in a receiving cavity of said hard disk drive; and (c) a filter media secured to said second surface of said cover.

2. The anti-diffusion apparatus of claim 1 wherein said filter media is an HEPA media with an inner and an outer layer.

3. The anti-diffusion apparatus of claim 2 wherein said inner layer includes activated charcoal granules.

4. The anti-diffusion apparatus of claim 1, wherein said body portion and cover portion are an integral one piece unit of injection molded thermo-plastic.

5. The anti-diffusion apparatus of claim 1 wherein said second surface includes a central recess, said filter element being secured within said recess.

6. The anti-diffusion apparatus of claim 5 wherein said media is ultra-sonically welded to a surface within said central recess with an adhesive ring provided for sealing fibers.

7. The anti-diffusion apparatus of claim 1, wherein said tortuous is an inwardly spiralling channel.

8. The anti-diffusion apparatus of claim 1, wherein said body portion has a flange proximate the periphery of said body portion along the lower surface thereof.

9. An anti-diffusion apparatus for a hard disk drive comprising:

(a) a body portion having an upper surface and a lower surface and at least one tortuous passage therein, said passage forming a channel in said lower surface and extending from an inlet at an outer end of said upper surface of said body portion to an outlet at an inner end of said lower surface;

(b) a cover portion having a first surface and a second surface and at least one opening therethrough, said first surface secured to said body portion with said first surface cooperatively engaging said lower surface of said body portion with said outlet aligned with said opening through said cover portion, said engaged body and cover portions forming a sealed passage therebetween, said sealed passage providing fluid communication between external environment and hard disk drive interior when said apparatus is positioned in a receiving cavity of said hard disk drive; and (c) a filter media secured to said second surface of said cover.

10. The anti-diffusion apparatus of claim 9 wherein said filter media is an HEPA media with an inner and an outer layer.

11. The anti-diffusion apparatus of claim 10 wherein said inner layer includes an activated charcoal granules.

12. The anti-diffusion apparatus of claim 9 wherein said tortuous passage is an inwardly spiralling channel.

13. The anti-diffusion apparatus of claim 9 wherein said second surface includes a central recess, said filter element being secured within said recess.

14. The anti-diffusion apparatus of claim 9, wherein said body portion and cover portion are an integral one piece unit made of injection molded thermo-plastic.

15. The anti-diffusion apparatus of claim 13 wherein said filter media is ultra-sonically welded to a surface within said central recess with an adhesive ring provided for sealing fibers.

16. The anti-diffusion apparatus of claim 9, wherein said body portion has an outer edge, and a coaxial inner edge, said lower surface having a flange proximate the periphery of said body portion, said flange extending from said outer edge inwardly toward said inner edge.

* * * * *

UNITED STATES PATENT AND TRADEMARK OFFICE
CERTIFICATE OF CORRECTION

PATENT NO. : 4,863,499

DATED : September 5, 1989

INVENTOR(S) : Richard J. Osendorf

It is certified that error appears in the above-identified patent and that said Letters Patent is hereby corrected as shown below:

Title on cover page and top of Column 1,

"Anti-Duffusion" should be -- Anti-Diffusion --

Column 4, Line 67 after "tortuous" insert -- passage --

Column 5, Line 33 after "tortuous" insert -- passage --

Signed and Sealed this

Second Day of July, 1991

*Attest:*

HARRY F. MANBECK, JR.

*Attesting Officer*     *Commissioner of Patents and Trademarks*